United States Patent [19]

Schrammen et al.

[11] Patent Number: 4,631,832
[45] Date of Patent: Dec. 30, 1986

[54] DEVICE FOR MEASURING AXLE GEOMETRY OF MOTOR VEHICLES WITH THE WHEELS TURNING

[75] Inventors: Peter Schrammen; Jürgen Weide, both of Kassel, Fed. Rep. of Germany

[73] Assignee: Wegmann & Co. GmbH, Kassel, Fed. Rep. of Germany

[21] Appl. No.: 853,487

[22] Filed: Apr. 18, 1986

[30] Foreign Application Priority Data

Apr. 24, 1985 [DE] Fed. Rep. of Germany ....... 3514759

[51] Int. Cl.⁴ .............................................. G01B 5/255
[52] U.S. Cl. ................................ 33/203.14; 33/203.12; 33/203.18
[58] Field of Search ........... 33/203.14, 203.12, 203.13, 33/203.18, 203.19

[56] References Cited

U.S. PATENT DOCUMENTS

| | | | |
|---|---|---|---|
| 2,758,385 | 8/1956 | Martin | 33/203.12 |
| 3,411,346 | 11/1968 | Gagliardi | 33/203.13 |
| 3,566,476 | 3/1971 | McWhorter | 33/203.12 |
| 3,587,325 | 6/1971 | Hunter | 33/203.13 |
| 4,170,070 | 10/1979 | Duchene | 33/203.18 |

FOREIGN PATENT DOCUMENTS

| | | | |
|---|---|---|---|
| 728371 | 2/1966 | Canada | 33/203.12 |
| 2204918 | 8/1973 | Fed. Rep. of Germany . | |
| 488670 | 6/1936 | United Kingdom | 33/203.12 |

Primary Examiner—Willis Little
Attorney, Agent, or Firm—Sprung, Horn, Kramer & Woods

[57] ABSTRACT

A device for measuring axle geometry at the wheel axles of motor vehicles with the wheels turning. The device has at least two frames. A driven pair of rotating cylinders is positioned in each frame. A wheel of the vehicle can rest on the cylinders. The frame can rotate freely in a horizontal plane around a pivot that is positioned away from the pair of cylinders along the length of the vehicle. The frame can also slide freely on the base plate in a direction parallel to the longitudinal axis of the vehicle. A sensing component can be placed against the side of the wheel. The sensing component has a goniometer that measures the position of the sensing component against the wheel and compares it to a reference that is fixed with respect to the device.

7 Claims, 3 Drawing Figures

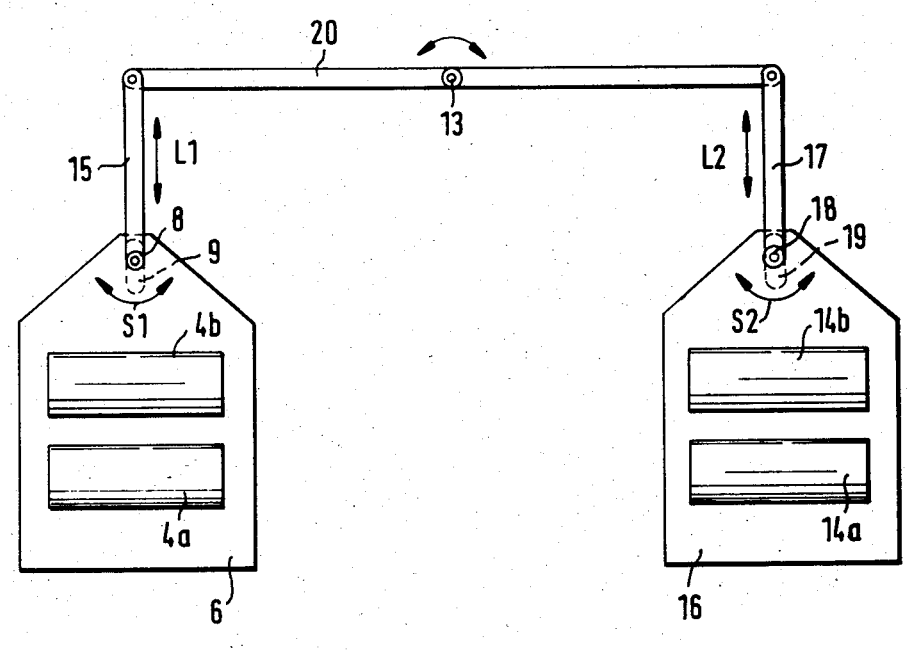

DEVICE FOR MEASURING AXLE GEOMETRY OF MOTOR VEHICLES WITH THE WHEELS TURNING'

BACKGROUND OF THE INVENTION

The present invention relates to a device for measuring axle geometry at the wheel axles of motor vehicles with the wheels turning, the device having at least two pairs of driven rotating cylinders that are positioned essentially away from the vehicle track and that the front or rear wheels of the vehicle can rest on, each pair positioned in a frame that can move in a horizontal plane in relation to a base plate, with a sensing component that can be positioned against the side of a wheel resting on a pair of the rotating cylinders and that is connected to a goniometer that determines the position of the sensing component in relation to a reference system that is fixed with respect to the device.

A device of this type is described, for example in German OS No. 2 204 918.

The frame in the known device is positioned in such a way that it can rotate in the horizontal plane and if necessary be shifted transversely in relation to the motor vehicle. The sensing component is mounted on the frame and, when it is applied to the side of the vehicle wheel, the force of reaction that acts on the sensing component adjusts the pair of rotating cylinders perpendicular to the frame. The torsion of the frame is then measured to determine the amount of toeing in. King-pin angle, castor length, and steering-knuckle pivot inclination, are determined by goniometers mounted on the sensing component.

The drawback of the known device is that it can only supply fairly precise results when the tire cap has an ideal shape. When the cap is slightly conical for instance, zero-force measurement becomes impossible because the conicity will generate transverse forces that also act on the cylinder pair and contaminate the results. Furthermore, another sensing component has to be applied to the inner side of the wheel to prevent it from getting displaced to the side. Applying a second sensing component of this type against the inner side of a wheel that is mounted on a vehicle, however, entails considerable problems in design because there is usually not enough space available.

Other devices that measure the axle geometry of a motor vehicle by sensing the orientation of the side of a stationary wheel are known. The vehicle rests on floating pairs of rotating cylinders that both enable unstressed measurement and allow the wheels to be turned 180° to eliminate rim runout.

These devices, however, cannot be employed to measure motor-vehicle wheels that have significant irregularities, raised lettering for example, on the sidewalls of the tires.

Still other devices are known that obtain measurements by sensing the sidewalls of the tires with the wheels turning on cylinder pairs that are fixed in position. Wheel irregularities like the aforesaid raised lettering are eliminated by the inertia of the measuring system.

The vehicle, however, must be secured to prevent lateral migration, and the finite vehicle track necessarily leads to deformation of the wheel suspension and hence defective results.

Finally, devices are known that exploit the forces of reaction (the transverse forces of the turning wheel for instance) on the cylinder pair to orient the pair in relation to the wheel either directly or through servo systems in such a way that the reaction forces tend to zero. The cylinder-pair angular positions in relation to a reference system that is fixed with respect to the device that result from the readjustment are directly exploited as a measure of such axle-geometry parameters as track and king-pin angle.

This method also has a drawback in that the results can be impermissibly contaminated by non-ideal (e.g. conical) tires and the resulting forces.

SUMMARY OF THE INVENTION

The object of the present invention is to provide a device of the type initially described that will allow measuring the axle geometry of a motor vehicle by sensing the sidewalls of the tires with the wheels constantly turning and eliminate any wheel-suspension deformation.

This object is attained in accordance with the invention in that the frame is mounted in such a way that it can rotate freely on the base plate in a horizontal plane around a pivot located along the length of the motor vehicle and away from the pair of rotating cylinders and can shift freely in a direction L parallel to the length of the vehicle.

The pivot for the frame in one especially practical embodiment of the device in accordance with the invention is located in front of the vehicle wheel and on the transverse central axis of the pair of rotating cylinders.

The pivot that is attached to the frame in another embodiment of the device is mounted in a slot positioned on the base plate parallel to the length of the motor vehicle.

The frame in still another embodiment is mounted on rollers on an intermediate plate that is in turn mounted on other rollers on the base plate itself and that can be displaced in a direction L parallel to the length of the vehicle, and the pivot is attached to the intermediate plate in such a way that it can rotate in relation to it.

It has turned out to be practical for the device to have four pairs of rotating cylinders, two pairs for the front axles and two for the rear axles.

It is practical in this embodiment to provide a mechanism to secure the body of the motor vehicle to the base plate.

It is not necessary to secure the body longitudinally in this way in an embodiment in which each of four frames is positioned in such a way that it can rotate independently of the others around its own pivot and the two frames associated with the front axles or the two frames associated with the rear axles are connected to each other in such a way as to allow them to move only in opposite directions L1 and L2 parallel to the longitudinal axis of the vehicle.

The pairs of rotating cylinders in the device in accordance with the invention will automatically assume such a state of equilibrium in relation to the turning vehicle wheels that the transverse forces will tend to zero. The absence of transverse forces in spite of the turning wheels will allow both measuring the axle geometry by sensing the sidewalls of the tires and securing the body of the vehicle, in order for example to allow headlights to be installed simultaneously.

Some preferred embodiments of the invention will now be described with reference to the attached drawings, wherein

BRIEF DESCRIPTION OF THE DRAWINGS

FIG. 3 is a schematic partial view of a device in which the components associated with either the front or the rear wheel axles of a vehicle are connected.

DETAILED DESCRIPTION OF THE PREFERRED EMBODIMENTS

Figure 1:
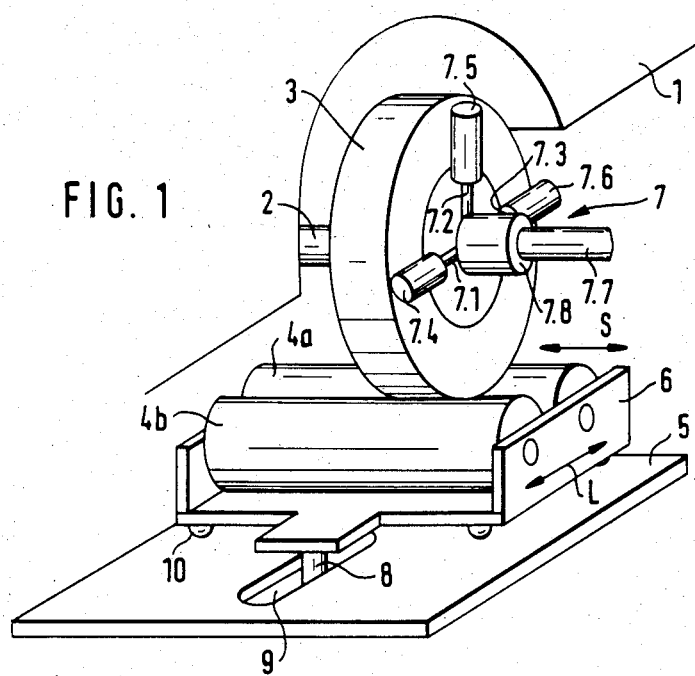
FIG. 1 is a schematic perspective view of one embodiment of a device for measuring axle geometry at the wheel axles of a motor vehicle.

FIG. 1 shows only the components of a test bench for measuring the axle geometry of an incompletely illustrated motor vehicle 1 that are essential to the invention.

A frame 6 is mounted on rollers 10 on a base plate 5 in such a way that the frame can move in a horizontal plane. The base plate is connected to the base of the bench. Frame 6 accommodates a pair 4a and 4b of rotating cylinders that support the wheel 3 of motor vehicle 1 when the geometry of its axle 2 is to be measured. Frame 6 can rotate around a pivot 8. Pivot 8 is positioned in front of the pair 4a and 4b of rotating cylinders, in relation to the direction that the vehicle travels in, on the axis that divides the pair, and can slide freely back and forth in a slot 9 that is positioned in base plate 5 parallel to the length of motor vehicle 1.

As will be evident from FIG. 1, frame 6 can accordingly slide freely in the direction indicated by double-headed arrow L and rotate freely around pivot 8 in the direction indicated by double-headed arrow S.

A sensing component 7 is positioned against the side of wheel 3. Sensing component 7 is of a type that is in itself known, with three arms 7.1, 7.2, and 7.3 arrayed in the shape of a T and a roller 7.4, 7.5, and 7.6 at the end of each arm and resting against the side of the wheel. Sensor arms 7.1, 7.2, and 7.3 revolve around a shaft 7.7, and the angle of rotation is measured by a goniometer 7.8.

Figure 2:
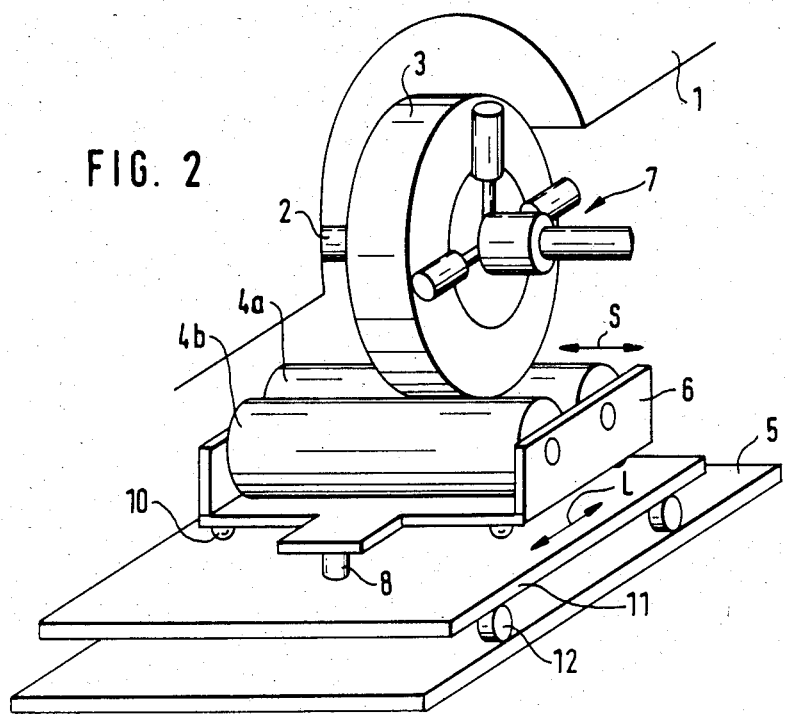
FIG. 2 is a view similar to that in FIG. 1 of another embodiment of a device for measuring axle geometry at the wheel axles of a motor vehicle.

The design of the device illustrated in FIG. 2 is basically similar to that of the device in FIG. 1, and similar parts are labeled with the same reference numbers.

The frame 6 with the pair 4a and 4b of rotating cylinders in the device illustrated in FIG. 2 is mounted on rollers 10 on an intermediate plate 11 that is itself mounted on rollers 12 in such a way that it can slide back and forth in the direction indicated by double-headed arrow L on base plate 5. Frame 6 cannot slide in relation to intermediate plate 11 but can only rotate around pivot 8, which turns in the intermediate plate.

The device illustrated in FIG. 2 functions like that illustrated in FIG. 1.

Various types of test bench can be designed using the devices just described.

A test bench can be designed for example with two frames and two pairs of rotating cylinders positioned apart essentially the width of the vehicle track in such a way that either both front wheels or both rear wheels can be placed on the cylinder pairs. This design eliminates the need of an additional mechanism to secure the body of the vehicle in relation to the base of the bench because one pair of wheels, the rear for instance, will remain stationary.

The test bench, however, can also be two-axle, with a total of four frames with cylinder pairs, two pairs associated with the front wheel axles and two with the rear wheel axles.

In this case it will usually be necessary to secure the vehicle both longitudinally and transversely.

Longitudinal securing can be eliminated if the two frames associated with one of the axles are fastened together in such a way that, although they can rotate independently of each other, they can move longitudinally only in opposite directions. A device of this type is schematically illustrated in FIG. 3.

This device involves two frames 6 and 16, each with one pair 4a and 4b or 14a and 14b of rotating cylinders. Both frames are associated with the two front wheel axles of a vehicle of which the axle geometry is to be measured, and are accordingly positioned approximately as far apart as the track of the vehicle.

Frame 6 can rotate freely around pivot 8 in the direction indicated by double-headed arrow S1, and frame 16 can rotate freely around pivot 18 in the direction indicated by double-headed arrow S2. Pivots 8 and 18 are positioned in slots 9 and 19 in an unillustrated base plate (corresponding to plate 5 in FIG. 1). Pivot 8 is attached by a connecting rod 15 to one end of a lever 20 that rotates around an axis 13 of rotation and pivot 18 is connected to the other end by a connecting rod 17. Pivots 8 and 18 can accordingly move parallel to the length of the vehicle only in the opposite directions indicated by double-headed arrows L1 and L2.

It will be appreciated that the instant specification and claims are set forth by way of illustration and not limitation, and that various modifications and changes may be made without departing from the spirit and scope of the present invention.

What is claimed is:

1. In a device for measuring axle geometry at the wheel axles of motor vehicles with the wheels turning, the device having at least two pairs of driven rotating cylinders on which the front or rear wheels of a vehicle can rest during use, a frame in which each pair is positioned, means mounting the frame on to a base plate, a sensing component positionable against the side of a wheel testing on a pair of the rotating cylinders and connected to a goniometer that determines the position of the sensing component in relation to a reference system that is fixed with respect to the device, the improvement wherein the means mounting the frame on the base plate includes a pivot located along the length of the motor vehicle and laterally spaced from the pair of rotating rollers and means permitting the frame to rotate freely on the base plate in a horizontal plane around said pivot and to shift freely in a direction L parallel to the length of the vehicle.

2. The device as in claim 1, wherein the pivot for the frame is located in front of the vehicle wheel and on the transverse central axis of the pair of rotating cylinders.

3. The device as in claim 1 or 2, wherein the means permitting the frame to shift freely comprises the pivot mounted in a slot positioned on the base plate parallel to the length of the motor vehicle.

4. The device as in claim 1 or 2, wherein the means permitting the frame to shift freely comprises mounting the frame on rollers on an intermediate plate that is mounted on other rollers on the base plate and that can be displaced in a direction L parallel to the length of the vehicle, and the pivot is attached to the intermediate plate such that it can rotate in relation to it.

5. The device as in claim 1, comprises four pairs of rotating cylinders, two pairs for the front wheels and two for the rear wheels.

6. The device as in claim 5, further comprising a mechanism to secure the body of the motor vehicle to the base plate.

7. The device as in claim 5, wherein each of four frames is positioned to rotate independently of the others around its own pivot and the two frames associated with the front wheels or the two frames associated with the rear wheels have means connecting them to each other to allow them to move only in opposite directions parallel to the longitudinal axis of the vehicle.

* * * * *

UNITED STATES PATENT AND TRADEMARK OFFICE
CERTIFICATE OF CORRECTION

PATENT NO. : 4,631,832

DATED : December 30, 1986

INVENTOR(S) : Peter Schrammen, et al.

It is certified that error appears in the above-identified patent and that said Letters Patent is hereby corrected as shown below:

Col. 1, line 4        After "Turning" delete "'"

Col. 4, line 46      After "wheel" delete "testing" and substitute --resting--

Signed and Sealed this

Twenty-seventh Day of October, 1987

Attest:

DONALD J. QUIGG

Attesting Officer      Commissioner of Patents and Trademarks